US007406569B2

(12) United States Patent  (10) Patent No.: US 7,406,569 B2
van de Waerdt  (45) Date of Patent: Jul. 29, 2008

(54) INSTRUCTION CACHE WAY PREDICTION FOR JUMP TARGETS

(75) Inventor: Jan-Willem van de Waerdt, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 781 days.

(21) Appl. No.: 10/218,074

(22) Filed: Aug. 12, 2002

(65) Prior Publication Data

US 2004/0030838 A1    Feb. 12, 2004

(51) Int. Cl.
  *G06F 12/00* (2006.01)
  *G06F 13/00* (2006.01)
  *G06F 12/14* (2006.01)
  *G06F 12/02* (2006.01)
(52) U.S. Cl. ............................ 711/137; 711/3; 711/118; 711/125; 711/128; 711/123; 711/204; 711/213; 711/214; 711/215; 711/217; 711/218
(58) Field of Classification Search ............... 711/3, 711/118, 125, 128, 137, 123, 204, 213, 214, 711/215, 217, 218
See application file for complete search history.

(56) References Cited

U.S. PATENT DOCUMENTS 5,752,069 A    5/1998 Roberts et al.

OTHER PUBLICATIONS

Weiyu Tang et al, "Integrated I-cache Way Predictor and Branch Target Buffer to Reduce Energy Consumption", Proceedings of the 4th International Symposium on High Performance Computing (ISHPC), May 15-17, 2002, pp. 120-132.*

"Way-Predicting Set-Associative Cache for High Performance and Low Energy Consumption", Inoue et al., Kyushu University.
"Reducing Set-Associative Cache Energy via Way-Prediction and Selective Direct-Mapping", Powell et al.,34th Proceedings of the International Symposium on Microarchitecture, 2001.
"Next Cache Line and Set Prediction", Calder et al., University of Colorado.
Calder B et al: "Next Cache Line and Set Prediction" Proceedings of the 22ND Annual Symposium on Computer Architecture. Santa Marherita Ligure. IT, Jun. 22-24, 1995, Proceedings of the Annual Symposium on Computer Architecture, New York, ACM, US, vol. Symp. 22, Jun. 22, 1995 pp. 287-296, XP000687716.
Powell M D et al: "Reducing Set-Associative Cache Energy Via Way-Prediction and Selective Direct-Mapping" Micro-34. Proceedings of the 34TH Annual ACM/IEEE International Symposium on Microarchitecture, Los Alamitos, CA: IEEE Comp Soc, US, Dec. 1, 2001, pp. 54-65, XP001075831.

* cited by examiner

*Primary Examiner*—Hyung Sough
*Assistant Examiner*—Mardochee Chery
(74) *Attorney, Agent, or Firm*—Peter Zawilski

(57) ABSTRACT

Typical cache architecture provides a single cache way prediction memory for use in predicting a cache way for both sequential and non-sequential instructions contained within a program stream. Unfortunately, one of the drawbacks of the prior art cache way prediction scheme lies in its efficiency when dealing with instructions that vary the PC in a non-sequential manner, such as branch instructions including jump instructions. To facilitate caching of non-sequential instructions an additional cache way prediction memory is provided to deal with the non-sequential instructions. Thus during program execution a decision circuit determines whether to use a sequential cache way prediction array or a non sequential cache way prediction array in dependence upon the type of instruction. Advantageously the improved cache way prediction scheme provides an increased cache hit percentage when used with non-sequential instructions.

20 Claims, 4 Drawing Sheets

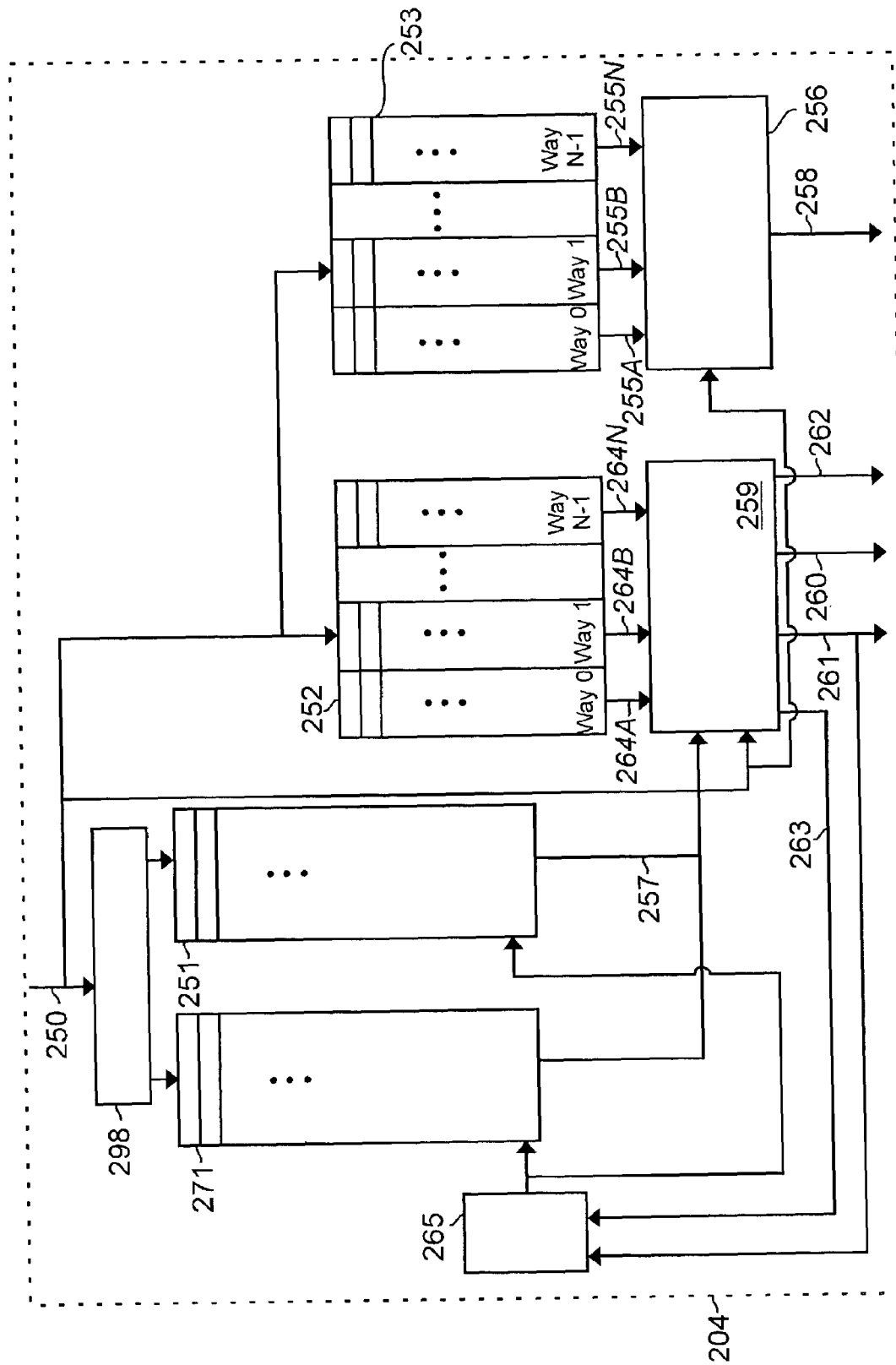

INSTRUCTION CACHE WAY PREDICTION FOR JUMP TARGETS

FIELD OF THE INVENTION

This invention relates to cache way prediction and more specifically to the area of cache way prediction for use in execution of instructions in a program stream including instructions of a non-sequential nature.

BACKGROUND OF THE INVENTION

As integrated circuit technology progresses to smaller feature sizes, faster central processing units (CPU)s are being developed as a result. Unfortunately access times of main memory, in the form of random access memory (RAM), where instruction data is typically stored, have not yet matched those of the CPU. The CPU must access these slower devices in order to retrieve instructions therefrom for processing thereof. In retrieving these instructions a bottleneck is realized between the CPU and the slower RAM. Typically, in order to reduce the effect of this bottleneck a cache memory is implemented between the main memory and the CPU to provide most recently used (MRU) instructions and data to the processor with lower latency.

It is known to those of skill in the art that cache memory is typically smaller in size and provides faster access times than main memory. These faster access times are facilitated by the cache memory typically residing within the processor, or very close by. Cache memory is typically of a different physical type than main memory. Main memory utilizes capacitors for storing data, where refresh cycles are necessary in order to maintain charge on the capacitors. Cache memory on the other hand does not require refreshing like main memory. Cache memory is typically in the form of static random access memory (SRAM), where each bit is stored without refreshing using approximately six transistors. Because more transistors are utilized to represent the bits within SRAM, the size per bit of this type of memory is much larger than dynamic RAM and as a result is also considerably more expensive than dynamic RAM. Therefore cache memory is used sparingly within computer systems, where this relatively smaller high-speed memory is typically used to hold the contents of the most recently processor utilized blocks of main memory.

The purpose of the cache memory is to increase instruction and data bandwidth of information flowing from the main memory to the CPU, as well as to decrease latency involved in transferring of information from main memory. Bandwidth determines the amount of information that can be transferred in a certain amount of time; latency determines the time it takes to retrieve a certain information item, in other words the amount of time it takes from the time of request to the time of delivery of the item. There are different configurations of cache memory that provide for this increased bandwidth and decreased latency, such as direct mapped and cache way set-associative. Of course, both latency and bandwidth are important in cache memory design and to many of skill in the art it is a fact that the cache way set-associative cache structure is preferable.

In the set-associative structure, as well as in direct mapped cache structures, the cache memory is typically configured into two parts, a data array and a tag array. The tag array is for storing a tag address for corresponding data bytes stored in the data array. Typically, each tag entry is associated with a data array entry, where each tag entry stores index information relating to each data array entry. Both arrays are two-dimensional and are organized into rows and columns. A column within either the data array or the tag array is typically referred to as a cache way, where there can be more than one cache way in a same cache memory. Thus a four-cache way set-associative cache memory would be configured with four columns, or cache ways, where both the data and tag arrays also have four columns each.

The processor executes instructions contained in the program stream in a similar manner to that of an assembly line. A processor pipeline is provided to facilitate processor operation on a number of instructions contained in the program stream. The term processor pipeline refers to a number of processing steps, or stages, it takes to accomplish a task; the fewer the processing steps, the shorter and more efficient the pipeline. The depth of a stage within the processor pipeline is defined as being the time delay through the stage. Thus, the depth of a stage affects the operating frequency of the processor. As a result, deeper pipelines having more stages have been implemented in processor. Having a lot of stages results in each stage having a shorter time delay, which facilitates a higher operating frequency of that stage. Efficient processor design balances the amount of stages and the delay through the stages. Thus, both the number of stages and the depth of each stage determine the processing efficiency of a processor. Within the processor pipeline, each processor pipeline stage performs a specific task before passing execution to a next processing stage within the pipeline. Within the processor pipeline instructions are loaded sequentially, in that, a portion of one instruction is processed after a previous one. Because the processor works on different stages of different instruction at the same time, more instructions can be executed in a shorter period of time using the pipeline, thus speeding up execution of the program stream. Once an instruction has been fully processed it leaves the pipeline.

During CPU execution of instructions within the pipeline both main memory and cache memory are accessed. Cache memory is accessed first to see if corresponding data bytes fulfill the memory access request, if the memory access request is unfulfilled then main memory is accessed. In a cache memory access operation the set-associative cache is accessed by a load/store unit, which searches the data cache for data residing at the memory access address. A cache way prediction array is a memory in which is stored an index into a cache way where the data blocks are most likely to reside in the data array. The cache way prediction array typically stores a number of bits in each entry, where each entry indicates which cache way has been most-recently used (MRU) with respect to the memory access address. Rows of the cache way prediction array are correlated to the memory access address. Providing a cache way prediction array potentially decreases processing time since a potential cache way is accessed prior to tag comparison. When a cache access is performed the cache way prediction array is used for accessing of a cache way in which data may potentially reside, thus reducing memory access times if a correct cache way prediction is realized. Of course, this is the case when a sequential tag lookup is followed by a data structure lookup. Approaches that access tag and data structures simultaneously have the same access time as the approach based on cache way prediction. The advantage of using cache way prediction lies in that only a single predicted cache way is accessed from the data array. Therefore, it allows for reduced power consumption and a more optimal physical layout in SRAM memory circuits.

After cache way prediction, a cache way represented by the prediction bits is enabled in data array, whereas all cache ways are enabled in the tag array. Enabling of a single cache way in the data array provides for decreased power consumption. All tag array ways are enabled because later on the prediction is validated using tag addresses retrieved from the tag array. Typically the tag addresses are smaller in bit size than data retrieved from an entry in the data array. As a result, power consumption is less of an issue when all cache ways are enabled in the tag array. The reduced power consumption is especially beneficial in multi-issue superscalar or Very Long Instruction Word (VLIW) processors, where a lot of instruction information is retrieved in every cycle. Of course to those of skill in the art it is appreciated that this is typical for an instruction cache only and not for data caches, which are discussed hereinbelow. The tag addresses within the tag array are examined to determine if any match the memory access address. In order to provide feedback as to the accuracy of the cache way prediction a tag comparison logic circuit is used to perform tag comparison in order to verify whether the cache was "hit" or "missed." If a match is found, the access is said to be a cache hit and the cache memory provides the associated data bytes from the data array. If a match is not found, the access is said to be a cache miss. When a cache miss occurs, the processor experiences a stall cycles. During the stall cycles the load/store unit retrieves required data from the main memory and provides this data to the processor so it can resume its execution of the instruction stream to end the stall cycle. Additionally, the load/store unit causes the requested data bytes to be transferred from the main memory into the data array. Furthermore, a portion of the memory access address associated with the retrieved data bytes is stored in the tag array. Finally, the cache way prediction array is updated to reflect the cache way to which the data bytes transferred from main memory. Having a tag comparison logic circuit in association with the cache way prediction array provides for a cache memory that offers a greater cache hit percentage.

Cache way prediction is well known to those of skill in the art, an example of which is disclosed in prior art U.S. Pat. No. 5,752,069, entitled "Superscalar microprocessor employing away [sic] prediction structure." In an n-cache way set associative cache memory, a requested cache element resides in any, or none of the n-cache ways within the cache memory in dependence upon the memory access address.

By relying on cache way prediction to identify the cache way in which the requested element is likely to reside, it is possible have access to only the identified cache way rather than accessing all cache ways, thereby advantageously reducing power consumption. In such a manner data bytes are transferred from the selected cache way in order to make up a cache line, or cache word for use by the processor thereafter. Cache way prediction therefore not only offers reduced power consumption but also offers improved access times to data contained in cache memory. A miss-prediction unfortunately causes processor stall cycles, thereby reducing processor performance and causing increased power consumption. Fortunately, the cache way prediction is typically correct at least 90% of the time, which generally improves system performance by allowing for minimal wait state operation in at 90% of the potential cases.

For instruction caches, the prediction accuracy of cache memories unfortunately decreases as non-sequential instructions are added into the program stream. Non-sequential instructions cause the CPU to access memory locations that are difficult to predict using the prior art cache way prediction array methodology. In some cases non-sequential instructions result in branching of a program to memory locations that are dependent upon the outcomes of prior instructions within the program stream and therefore a step size of these branches may vary as the program stream is executed. Therefore prediction accuracy for non-sequential program execution is reduced and as a result more cache misses occur. This causes increased processor stall cycles, thus leading to inefficient program stream execution and results in increased power consumption. For sequential instructions a look-ahead program counter is used to access the prediction memory. Unfortunately, when executing of branch instructions within a program stream the look-ahead program counter is not available for use in cache way prediction.

There exists a need to provide a more efficient cache way prediction scheme, for use in an instruction cache, that offers decreased power consumption while providing improved cache way prediction for non-sequential program execution.

SUMMARY OF THE INVENTION

In accordance with the invention there is provided a cache memory for use in storage and retrieval of (sequential and non-sequential) instructions contained within a program stream for execution by a processor, comprising: a tag array arranged in a plurality of rows and a plurality of cache ways having a plurality of storage locations located at each intersection of one of said plurality of rows and one of said plurality of cache ways, each of said storage locations from the plurality of storage locations for storing a tag address; a data array arranged in a plurality of rows and a plurality of cache ways having a plurality of storage locations located at each intersection of one of said plurality of rows and one of said plurality of cache ways, each of said storage locations from the plurality of storage locations for storing data bytes representing instructions; a first cache way prediction array having a plurality of storage locations arranged in a plurality of rows, each storage location from the plurality for storing a first set of cache way prediction bits; a second cache way prediction array having a plurality of storage locations arranged in a plurality of rows, each storage location from the plurality for storing a second set of cache way prediction bits; and, a decision circuit for receiving an instruction from the program stream, the decision circuit for determining whether the instruction is one of a sequential and non sequential type and for enabling one of the first cache way prediction array and the second cache way prediction array, respectively, in dependence thereon, said enabled prediction array accessed at a request address to retrieve one of the first set of cache way prediction bits and the second set of cache way prediction bits, respectively, for enabling a cache way within the tag array and data array in dependence upon the retrieved prediction bits to facilitate retrieval of the tag address and the data bytes from the tag array and data array, respectively, within the enabled cache way.

In accordance with an aspect of the invention there is provided a method of enabling a cache prediction array from a plurality of cache prediction arrays comprising the steps of: providing an instruction at an address of a program counter for subsequent execution by a processor; determining whether the instruction is an instruction of a predetermined type; and, enabling one of a first cache prediction array if the instruction is other than an instruction of a predetermined type and a second cache prediction array if the instruction is an instruction of a predetermined type.

In accordance with an aspect of the invention there is provided a cache memory for use in storage and retrieval of sequential and non-sequential instructions contained within a program stream, comprising: a first cache way prediction array for use in predicting a cache way for a first set of data; a second cache way prediction array for use in predicting a cache way for a second set of data; and, a decision circuit for receiving instruction data from the program stream and for selecting between the first cache way prediction array and the second cache way prediction array in dependence upon the instruction data.

In accordance with another aspect of the invention there is provided a storage medium having stored therein data, the data for use in implementing of integrated circuit designs, the data including data descriptive of circuit elements including: a tag array arranged in a plurality of rows and a plurality of cache ways having a plurality of storage locations located at each intersection of one of said plurality of rows and one of said plurality of cache ways, each of said storage locations from the plurality of storage locations for storing a tag address; a data array arranged in a plurality of rows and a plurality of cache ways having a plurality of storage locations located at each intersection of one of said plurality of rows and one of said plurality of cache ways, each of said storage locations from the plurality of storage locations for storing data bytes relating to instructions; a first cache way prediction array having a plurality of storage locations arranged in a plurality of rows, each storage location from the plurality for storing a first set of cache way prediction bits; a second cache way prediction array having a plurality of storage locations arranged in a plurality of rows, each storage location from the plurality for storing a second set of cache way prediction bits; and, a decision circuit for receiving an instruction from the program stream, the decision circuit for determining whether the instruction is one of a sequential and non sequential type and for enabling one of the first cache way prediction array and the second cache way prediction array, respectively, in dependence thereon, said enabled prediction array accessed at a request address to retrieve one of the first set of cache way prediction bits and the second set of cache way prediction bits, respectively, for enabling a cache way within the tag array and data array in dependence upon the retrieved prediction bits to facilitate retrieval of the tag address and the data bytes from the tag array and data array, respectively, within the enabled cache way.

BRIEF DESCRIPTION OF THE DRAWINGS

The invention will now be described with reference to the drawings in which:

FIG. 2a illustrates a cache architecture in accordance with an embodiment of the invention;

DETAILED DESCRIPTION OF PREFERRED EMBODIMENTS OF THE INVENTION

Figure 1:
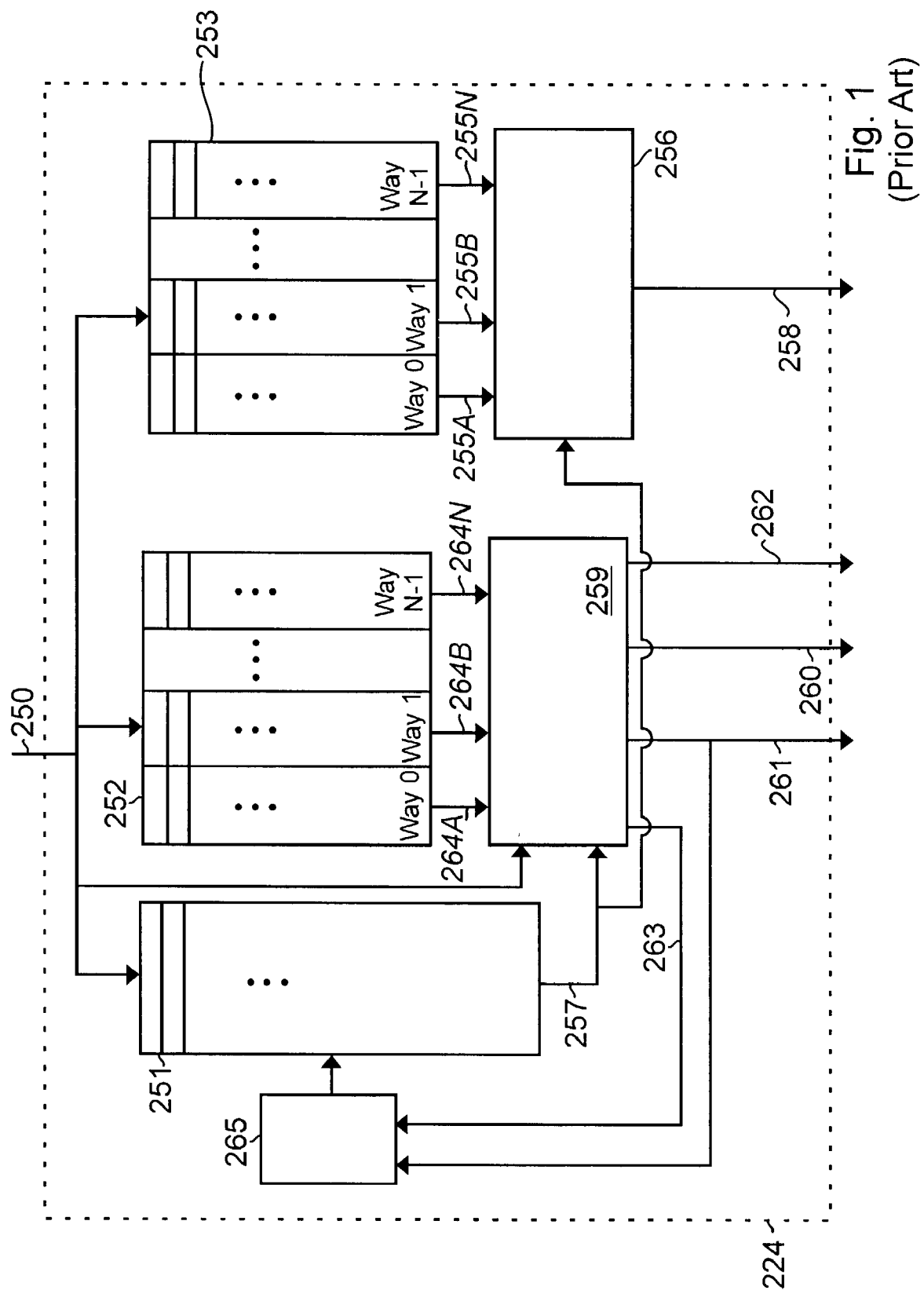
FIG. 1 illustrates a prior art cache architecture in accordance with U.S. Pat. No. 5,752,069.

FIG. 1 illustrates a prior art cache architecture 224 in accordance with U.S. Pat. No. 5,752,069, entitled, "Superscalar microproce [sic] prediction structure," which issued to Roberts et al. It is believed that a review of the matter disclosed by Roberts et al. may be convenient for an appreciation of the present invention. It is noted that although the following discussion of the prior art describes the cache way prediction structure with respect to a data cache, a similar structure is contemplated for instruction caches as well.

The prior art cache architecture 224 is comprised of a cache tag array 252 and a cache data array 253, with each of these arrays being N-cache way set associative. Output ports are provided on the cache data array 253 for providing data bytes from the cache data array 253 to a set of cache way data buses 255A-255N (collectively referred to as cache way data buses 255). Such that for a clock cycle, N sets of data bytes are provided from output ports of cache data array 253 to the cache way data buses 255.

The cache way data buses 255 are coupled to an N-to-One cache way selection block 256. The cache way selection block 256 is typically comprised of multiple multiplexers, where each multiplexer is coupled to the cache way data buses 255 and to a cache way prediction bus 257 from a cache way prediction array 251. Each of the cache way data buses 255 conveys data bytes from a particular cache way when a given cache way is indexed using the cache way prediction array 251 in dependence upon a request address provided on an address request bus 250 from a load/store unit (not shown). A separate cache way prediction is performed for each request address on the address request bus, where for each request address the cache way prediction array 251, using cache way prediction bus 257, enables a multiplexer from within the N-to-One cache way selection block 256 for selecting one of the N cache ways of data cache 224 to provide requested data bytes from the cache data array 253 to a data bus 258 coupled to an output port on the an N-to-One cache way selection block 256. Data bytes associated with the predicted cache way for each request address are conveyed on data bus 258 to the load/store unit (not shown) for use by a processor (not shown).

The cache way prediction array 251 is configured to store cache way prediction bits for use in predicting a cache way within the data and tag arrays. The amount of prediction bits 'n' stored within the cache way prediction array 251 is related to the amount of cache ways $2^n$. So for an 8-cache way set associative cache, three bits are stored, and for a 4-cache way set associative cache only 2 bits are stored. For example, when using an 8 cache way set associative cache, the width of the prediction memories is 3 bits, since $2^3=8$, which is the associativity of the cache. The depth, or number of rows within the prediction array is typically a power of two and is tuneable to achieve a certain cache way prediction accuracy. Using a 32 bit request address A[31:0], a cache line size of $2^6=64$ bytes and $2^8$ entries in the prediction memory, bits A[13:6] are used to index the cache way prediction array 251, where bits 13 down to 6 are eight location bits, reflecting the depth of the cache way prediction array 251. The larger the depth the better the prediction array is at differentiating between different request addresses. If for example, two different request addresses only differ at bit location 14 and eight location bits are used for accessing the prediction array, then address aliasing results since the same cache way is predicted for two different addresses. This same cache way prediction in most cases is likely not correct. Therefore, as the prediction array depth is increased, at the cost of a doubling of the memory capacity size, address aliasing is reduced, thus improving prediction accuracy.

The cache tag array 252 and the cache data array 253 are configured similarly with respect to the numbers of cache ways and the numbers of cache sets. Of course, more than one cache way prediction for a particular set of cache tag array 252 and cache data array 253 may be stored within cache way prediction array 251. For example, if the cache way prediction array 251 is configured with twice as many cache sets as cache tag array 252 and cache data array 253, then two cache way predictions are stored within the cache way prediction array 251 for each set of the cache tag array 252 and the cache data array 253. In this case, the number of bits from the request address that are used to index the cache way prediction array 251 is typically one larger than the number of bits used to index cache tag array 252 and cache data array 253. The extra bit in this case determines which of the two stored cache way predictions is selected as the cache way prediction for that request address. Typically, the likelihood of storing a correct cache way prediction for a given request address is increased by the number of cache way predictions stored for the indexed set of cache tag array 252 and cache data array 253. Performance may therefore be increased by using a cache way prediction array having more than one cache way prediction array per set of cache tag array 252 and cache data array 253. Typically the cache way prediction array 251 is a linear array of 512 cache way predictions entries stored within the rows, and each cache way prediction is a decoded value as described above. Typically the cache way prediction array 251 is a linear array comprising a number of cache way prediction storage locations equal in number to the number of sets multiplied by the number of cache ways in data cache array 253.

While a request address is used for indexing into cache tag array 252 and cache data array 253, the request address is also used for indexing the cache way prediction array 251. Cache way prediction array 251 conveys the indexed cache way prediction on cache way prediction bus 257, causing the data bytes associated with the predicted cache way to be conveyed on data bus 258. Therefore, the time delay from the beginning of a data cache 224 access to data being provided by data cache 224, is characterized by the time delay caused by the cache way prediction array 251 followed by a small delay associated with enabling output ports for selection of output bytes using the predicted cache way.

Additionally, cache way prediction bus 257 is also coupled to a tag comparison block 259. The tag comparison block 259 comprises logic circuits configured to determine whether or not the request address results in a cache hit using the predicted cache way, results in a cache hit using another cache way, or results in a cache miss using the predicted cache way. Tag comparison block 259 compares the indexed tags provided by a set of cache way tag buses 264A-264N, similar to cache way data buses 255, to the request address, then determines if the actual hit cache way from the tag comparisons matches the predicted cache way from cache way prediction array 251. Since the access to cache tag array 252 and the tag comparisons that follow may not complete in a given clock cycle, tag comparison block 259 produces signals early in a clock cycle subsequent to the clock cycle in which the associated addresses access data cache 224.

If a hit in the predicted cache way is detected for a load request, a signal is asserted on a hit predicted cache way bus 260. The hit predicted cache way bus 260 is coupled between tag comparison block 259 and load/store unit (not shown) and reservation stations (not shown). A signal associated with each possible request address is conveyed on the hit predicted cache way bus 260, and both load/store unit 222 and reservation stations 210 are configured to associate each signal with the appropriate address request from the previous clock cycle. A hit in the predicted cache way indicates that the data conveyed on data bus 258 in the previous clock cycle is correct. Reservation stations may then discard any instructions that received the data and executed the data in the current clock cycle, and the load/store unit may discard the load instruction associated with the requested address.

If a hit in the unpredicted cache way is detected for a load request, a corresponding signal is asserted on a hit unpredicted cache way bus 261 coupled to the load/store unit and reservation stations. A hit in an unpredicted cache way causes load/store unit to cancel a request address conveyed on the portion of request address bus 250 upon which the unpredicted cache way hit address was conveyed in the previous clock cycle. Data cache 224 uses the idle port to convey the correct data on data bus 258. The cache way prediction is corrected while the corrected data is conveyed on data bus 258. The cache way prediction is corrected via a cache way prediction control unit 265. The cache way prediction control unit 265 receives a signal on a hit cache way bus 263 and a hit unpredicted cache way bus 261. When a hit in an unpredicted cache way signal is asserted, the cache way in which the hit occurs is conveyed on hit cache way bus 263. Cache way prediction control unit 265 conveys the hitting cache way to a write port on cache way prediction array 251, and signals cache way prediction array 251 to write the value into the location indexed by the associated address stored by data cache 224 from the previous clock cycle. Thus, a hit in an unpredicted cache way is penalized only a clock cycle. Additionally, reservation stations 210 detect the hit in the unpredicted cache way and cause the data forwarded in the previous clock cycle with respect to the associated address to be invalidated. If an instruction which received the incorrect data as an operand is currently being executed by a respective functional unit, reservations stations assert a signal to other reservation stations and reorder a buffer indicative of the incorrect data so that the other reservation stations and the reorder buffer ignore any results from executing an instruction with the incorrect data.

If a miss is detected, a corresponding signal is asserted on a miss bus 262 coupled to the load/store unit and reservation stations. Load/store unit records the miss for later miss processing, and reservation stations perform similar actions to the case of a hit in an unpredicted cache way described above. Cache way prediction array 251 is not modified for this case, since there is no correct predicted cache way for a cache miss.

The cache architecture 224 is typically accessed using a program counter (PC). The PC is used as an index by the processor for indexing of instructions for execution within a program stream. As an instruction within the program stream is accessed the PC acts as the request address for accessing the cache architecture 224. In sequential program flow instructions within the program are of a nature that result in the processor to perform operations on the instructions that result in the processor to other than non-sequentially varying the PC. For instance, jump instructions are other than sequential instructions and they cause the PC to jump to another part of the program stream. For indexing the cache way prediction array, the request address is easily derived from the PC because the PC is varied in known steps for sequential instructions.

Unfortunately, one of the drawbacks of the described prior art cache way prediction scheme lies in its efficiency when dealing with instructions that vary the PC in a non-sequential manner, such as branch instructions including jump instructions. Accessing the cache way prediction array prior to the data and tag arrays necessitates an earlier availability of the request address in the program stream contained within the processor pipeline in order to make use of the cache way prediction array 251. For sequential program execution this does not pose a large problem in terms of processing time. However, when non-sequential instructions, such as jump instructions, are present within the program stream they interrupt this sequential program stream flow by directing the PC of the processor to a non-sequential target PC in order to allow for execution of instructions residing at a branch location.

The term branch instruction is used to refer to instructions that permit non-sequential execution of instruction code within an instruction data stream. The term jump instruction as used herein refers to branch instructions for branching to a location within the instruction data at least a predetermined distance from a present PC indicated location.

Typically, in program streams compiled for Very Long Instruction Word (VLIW) processors, with multiple individual instruction grouped in a VLIW instruction, jump instructions are frequent within the program stream. As a result, performance degradation is realized in these processor systems because the frequency of non-sequential jump instructions is quite high. This frequency of instructions causes cache misses to occur since cache is not adequately designed to deal with non-sequential instructions. Accurate cache way prediction for non-sequential instructions is not performed adequately enough using the prior art techniques. The miss predictions add too much delay to the instruction fetch path, resulting in potential processor performance degradation.

Therefore, in order to overcome the deficiencies of the prior art, a process for performing instruction cache way prediction of jump targets by means of a separate cache way prediction array is disclosed in accordance with an embodiment of the invention. FIG. 2a illustrates a cache architecture 204 for use with non-sequential jump targets. The cache architecture 204 in this case is provided with an additional cache way prediction array 271, thus providing a cache architecture 204 having two cache way prediction arrays: a non-sequential cache way prediction array 271 and a sequential cache way prediction array 251. The sequential cache way prediction array 251 in this case is the same cache way prediction array as shown in prior art FIG. 1.

The non-sequential cache way prediction array 271 is configured to store cache way prediction bits for caching of non-sequential instructions executed by the processor within the program stream. The non-sequential cache way prediction array 271 is indexed using the PC of the non-sequential instruction. Updates to prediction bits stored within the non-sequential cache way prediction array 271 are performed in a similar manner to those with respect to the sequential cache way prediction array 251. Likewise the non-sequential cache way prediction array 271 is coupled to the cache way prediction bus 257 to index 1 of N cache ways for cache way prediction. Cache way predictions using the non-sequential cache way prediction array 271 and updates on mis-predictions are performed in a similar manner as for the sequential cache way prediction array 251. A decision circuit 298 is also provided within the cache 204 in order to determine whether to use the sequential or non-sequential cache way prediction arrays. The decision circuit 298 receives the request address using the address request bus and also receives a decision signal from the processor in order to enable one of the sequential or non-sequential cache way prediction arrays.

Figure 2B:
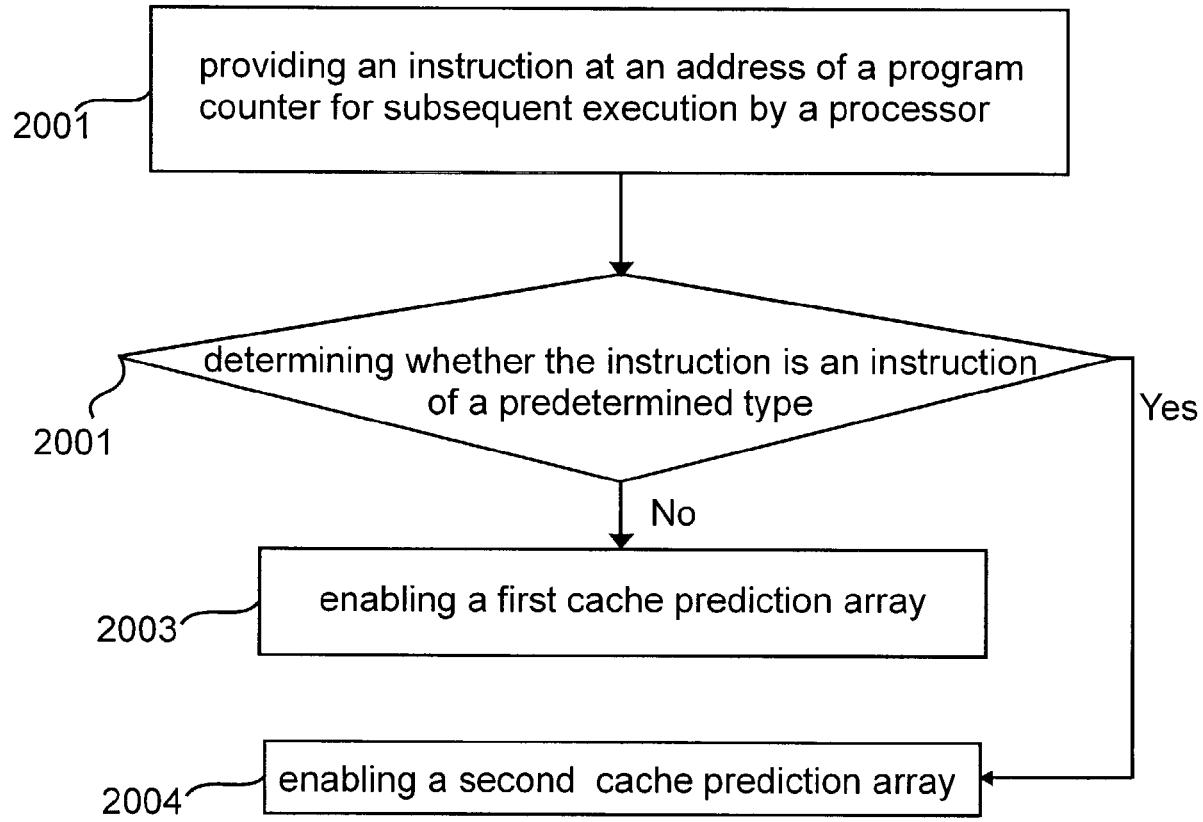
FIG. 2b illustrates operating steps for a cache architecture in accordance with the embodiment of the invention; and, FIG. 3 illustrates a program stream for execution by a processor having sequential and non-sequential instructions.

FIG. 2b, outlines steps taken for accessing of the non-sequential cache way prediction array 271. The non-sequential cache way prediction array is enabled by reading an instruction at an address of a program counter for subsequent execution by a processor at step 2001. At 2002, a step of determining whether the instruction is an instruction of a predetermined type is performed. If the instruction other than an instruction of the predetermined type the sequential cache way prediction array is enabled at step 2003. If the instruction is of the predetermined type then the non-sequential cache way prediction array is enabled at step 2004. Typically, the instructions of a predetermined type are instructions that result in non-sequential code execution as set out herein.

Figure 3:
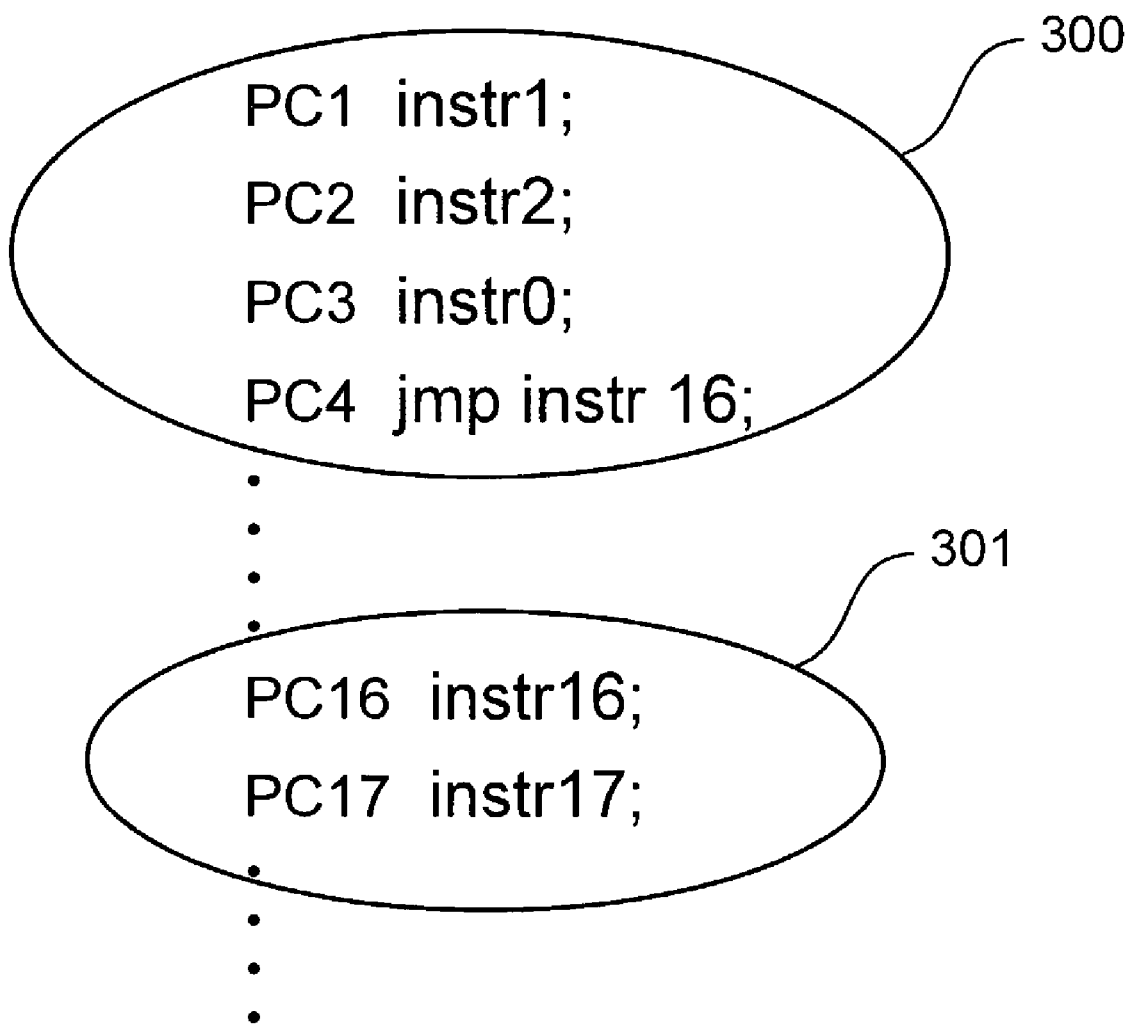

FIG. 3 illustrates a number of program instructions contained within a program stream correlated to the PC of the processor. The program stream is divided into two parts, in the first part 300 the instructions follow a sequential flow and in the second part 301 the instructions follow a non-sequential flow. When executing instructions within the program stream the non-sequential cache way prediction array 271 is accessed using non-sequential instructions, such as a branch instruction in the form of a jump instruction, and the sequential cache way prediction array 251 is accessed using sequential instructions. The request address provided to the non-sequential cache way prediction array 271 is the address of the PC containing the non-sequential branch instruction and not the PC targeted by the branch instruction. This former information is available much earlier in the processor pipeline, at instruction fetching time, than the PC of the target jump instruction at instruction decoding or execution time. This operation will be explained by way of example.

Referring to FIG. 3, in use the processor starts execution of the program stream at PC1. For accessing cache memory 204, the request address is the address of the PC. At PC1, PC1 is used as the request address to access the sequential cache way prediction array. If a cache hit results then 'instr1' is provided to the processor by the cache. After processing of 'instr1' the PC is incremented to PC2. For PC2, the request address is either precalculated from PC1 or PC2 is used to access the sequential cache way prediction array. After processing of 'instr2' the PC is incremented to PC3. For PC3, the request address is either precalculated from PC1 or PC2, or PC3 is used to access the sequential cache way prediction array. Once the instruction located at PC3 has been processed the PC is incremented to PC4. For PC4, the request address is either precalculated from PC1 or PC2 or PC3, or PC4 is used to access the sequential cache way prediction array. Because the previous instructions are sequential in nature the request address is easily determined from the PC. At PC4 a non-sequential instruction is found, in the form of a jump instruction. When this direct jump instruction is executed it is responsible for directing the PC to PC16. There are mainly two different types of jump instructions, direct and indirect. Direct jump instructions have a fixed jump size that does not vary with program execution. Indirect jump instructions on the other hand have variable jump sizes, where the PC targeted by the jump instruction changes dynamically during program execution. As a result, the location to which an indirect jump instruction redirects the PC is difficult to predict.

At PC4, after retrieving the instruction from cache memory or main memory, the decision circuit enables the non-sequential cache way prediction array and to disables the sequential cache way prediction array. In this manner, after execution of the jump instruction at PC4, the PC is directed to PC16. At PC16, because of the jump instruction at PC4, the request address cannot be precalculated from any previous address because of the jump to a non-sequential PC. As a result PC4 is used as the request address to access the non-sequential cache way prediction array for retrieving 'instr16' from the cache 204. After processing of 'instr16', the PC is incremented to PC17. Because the instruction at PC16 was not a jump type instruction, the decision circuit disables the non-sequential cache way prediction array and enables the sequential cache way prediction array. Such that at PC17 the request address is either precalculated from PC16 or PC17 is used as the request address.

Advantageously, by using the non-sequential cache way prediction array, PC4 serves as a same request address for two different prediction arrays. At PC4 the sequential prediction array is accessed using a request address derived from a previous sequential PC or PC4, then at PC16 the non-sequential prediction array is accessed using the request address derived from PC4. Without the two different prediction arrays cache misses would be a lot higher since determination of the request address is not facilitated by non-sequential program stream execution. Having the two different prediction arrays eliminates the same prediction array from being overwritten at a same address by different data bytes in response to a cache miss.

Advantageously, the proposed method reaches high prediction accuracy when used in cache way prediction with instructions that are direct jump instructions. For indirect jump instructions the prediction accuracy is dependent on the frequency by which the targeted PC changes.

Of course, there is no reason for the sequential and non-sequential prediction arrays to be of the same size. For instance it may be preferable to have the non-sequential prediction array contain more rows than the sequential prediction array for processors that tend to execute more non-sequential instructions in the program stream. In this manner because the non-sequential prediction array is utilized more, having a smaller sized sequential prediction array reduces memory costs. Of course, if the program stream contains more sequential instructions then it may prove advantageous to provide a larger sequential prediction array.

Advantageously, by relying on prediction to identify the cache way in which the requested element is likely to reside, it is possible to retrieve access to only the identified cache way; rather than accessing all cache ways. By limiting the amount of accessed cache ways to one, power can be reduced. Having to access other cache ways or main memory consumes significantly more power and therefore accurate cache way prediction provides a decreased power consumption solution. For portable applications, such as portable computers, decreased power consumption is paramount. To those of skill in the art is it known that much of the processor's energy is wasted in resolving cache misses.

Further advantageously, the increased cache hit percentage facilitates enabling of a single cache way in the data array a majority of the time, thus it is typically no longer necessary to have simultaneous access to all ways of the data array at the same time, resulting in decreased power consumption. This facilitates using different organizations of logical cache ways in physical SRAM circuits.

Numerous other embodiments may be envisaged without departing from the spirit or scope of the invention.

What is claimed is:

1. A cache memory for use in storage and retrieval of sequential and non-sequential instructions contained within a program stream for execution by a processor, comprising:
   a tag array arranged in a plurality of rows and a plurality of cache ways having a plurality of storage locations located at each intersection of one of said plurality of rows and one of said plurality of cache ways, each of said storage locations from the plurality of storage locations for storing a tag address;
   a data array arranged in a plurality of rows and a plurality of cache ways having a plurality of storage locations located at each intersection of one of said plurality of rows and one of said plurality of cache ways, each of said storage locations from the plurality of storage locations for storing data bytes relating to instructions;
   a first cache way prediction array having a plurality of storage locations arranged in a plurality of rows, each storage location from the plurality for storing a first set of cache way prediction bits;
   a second cache way prediction array having a plurality of storage locations arranged in a plurality of rows, each storage location from the plurality for storing a second set of cache way prediction bits;
   a decision circuit for receiving an instruction from the program stream, the decision circuit for determining whether the instruction is one of a sequential and non sequential type and for enabling one of the first cache way prediction array and the second cache way prediction array, respectively, in dependence thereon, said enabled prediction array accessed at a request address to retrieve one of the first set of cache way prediction bits and the second set of cache way prediction bits, respectively, for enabling a cache way within the tag array and data array in dependence upon the retrieved prediction bits to facilitate retrieval of the tag address and the data bytes from the tag array and data array, respectively, within the enabled cache way; and
   a program counter for use by the processor in execution of the instructions within the program stream and wherein the request address is derived from the program counter;
   wherein the decision circuit comprises circuitry for enabling the first cache way prediction array and disabling the second cache way prediction array when the instruction indexed by the program counter is other than a branch instruction.

2. A cache memory according to claim 1, wherein the decision circuit comprises circuitry for disabling the first cache way prediction array and enabling the second cache way prediction array when the instruction indexed by the program counter is a branch instruction.

3. A cache memory according to claim 1, wherein the decision circuit comprises circuitry for disabling the first cache way prediction array and enabling the second cache way prediction array when the instruction indexed by the program counter is a jump instruction.

4. A cache memory according to claim 1, wherein the cache way prediction arrays comprise address input ports and wherein the address input ports to the cache way prediction arrays are coupled respectively one with another such that a same address data is provided to each of the cache way prediction arrays and a difference in data retrieved from the cache way prediction arrays is determined in dependence upon the instruction type.

5. A cache memory according to claim 1, wherein the first cache way prediction array comprises more storage locations than the second cache way prediction array.

6. A cache memory according to claim 1, wherein the second cache way prediction array comprises more storage locations than the first cache way prediction array.

7. A method of enabling a cache prediction array from a plurality of cache prediction arrays comprising the steps of:
   providing an instruction at an address of a program counter for subsequent execution by a processor;
   determining whether the instruction is an instruction of a predetermined type;
   enabling one of a first cache prediction array if the instruction is other than an instruction of a predetermined type and a second cache prediction array if the instruction is an instruction of a predetermined type;
   enabling the first cache way prediction array and disabling the second cache way prediction array when the instruction indexed by the program counter is other than a branch instruction; and
   disabling the first cache way prediction array and enabling the second cache way prediction array when the instruction indexed by the program counter is a branch instruction.

8. A method according to claim 7, wherein an instruction of a predetermined type includes a branch instruction.

9. A method according to claim 8, wherein the branch instruction is an instruction of the type that causes the program counter to vary non-sequentially within an instruction data stream.

10. A method according to claim 9, wherein a branch instruction consists of a jump instruction.

11. A memory having stored therein data relating to instructions for performing the steps of:
providing an instruction at an address of a program counter for subsequent execution by a processor;
determining whether the instruction is an instruction of a predetermined type;
enabling one of a first cache prediction array if the instruction is other than an instruction of a predetermined type and a second cache prediction array if the instruction is an instruction of a predetermined type;
enabling the first cache way prediction array and disabling the second cache way prediction array when the instruction indexed by the program counter is other than a branch instruction; and
disabling the first cache way prediction array and enabling the second cache way prediction array when the instruction indexed by the program counter is a branch instruction.

12. A method according to claim 11, wherein according to the data the instruction of a predetermined type includes a branch instruction.

13. A method according to claim 12, wherein according to the data the branch instruction is an instruction of the type that causes the program counter to a non-sequential address.

14. A method according to claim 13, wherein according to the data a branch instruction consists of a jump instruction.

15. A cache memory for use in storage and retrieval of sequential and non-sequential instructions contained within a program stream, comprising:
a first cache way prediction array for use in predicting a cache way for a first set of data;
a second cache way prediction array for use in predicting a cache way for a second set of data;
a decision circuit for receiving instruction data from the program stream and for selecting between the first cache way prediction array and the second cache way prediction array in dependence upon the instruction data;
a program counter for use in execution of the instructions within the program stream;
wherein the decision circuit comprises circuitry for:
enabling the first cache way prediction array and disabling the second cache way prediction array when the instruction indexed by the program counter is other than a branch instruction; and
disabling the first cache way prediction array and enabling the second cache way prediction array when the instruction indexed by the program counter is a branch instruction.

16. A storage medium having stored therein data, the data for use in implementing of integrated circuit designs, the data including data descriptive of circuit elements including:
a tag array arranged in a plurality of rows and a plurality of cache ways having a plurality of storage locations located at each intersection of one of said plurality of rows and one of said plurality of cache ways, each of said storage locations from the plurality of storage locations for storing a tag address;
a data array arranged in a plurality of rows and a plurality of cache ways having a plurality of storage locations located at each intersection of one of said plurality of rows and one of said plurality of cache ways, each of said storage locations from the plurality of storage locations for storing data bytes relating to instructions;
a first cache way prediction array having a plurality of storage locations arranged in a plurality of rows, each storage location from the plurality for storing a first set of cache way prediction bits;
a second cache way prediction array having a plurality of storage locations arranged in a plurality of rows, each storage location from the plurality for storing a second set of cache way prediction bits; and,
a decision circuit for receiving an instruction from the program stream, the decision circuit for determining whether the instruction is one of a sequential and non sequential type and for enabling one of the first cache way prediction array and the second cache way prediction array, respectively, in dependence thereon, said enabled prediction array accessed at a request address to retrieve one of the first set of cache way prediction bits and the second set of cache way prediction bits, respectively, for enabling a cache way within the tag array and data array in dependence upon the retrieved prediction bits to facilitate retrieval of the tag address and the data bytes from the tag array and data array, respectively, within the enabled cache way;
a program counter for use in execution of the instructions within the program stream and wherein the request address is derived from the program counter; and
circuitry for enabling the first cache way prediction array and disabling the second cache way prediction array when the instruction indexed by the program counter is other than a branch instruction.

17. A storage medium according to claim 16, comprising data stored therein descriptive of circuitry for disabling the first cache way prediction array and enabling the second cache way prediction array when the instruction indexed by the program counter is a branch instruction.

18. A storage medium according to claim 16, wherein the data stored therein descriptive of the decision circuit includes data descriptive of circuitry for disabling the first cache way prediction array and enabling the second cache way prediction array when the instruction indexed by the program counter is a jump instruction.

19. A storage medium according to claim 16, wherein the data stored therein descriptive of the cache way prediction arrays includes data descriptive of address input ports and wherein the address input ports to the cache way prediction arrays are coupled respectively one with another such that a same address data is provided to each of the cache way prediction arrays and a difference in data retrieved from the cache way prediction arrays is determined in dependence upon the instruction type.

20. A storage medium according to claim 16, wherein the data stored therein descriptive of the cache way prediction arrays indicates the first cache way prediction array comprising more storage locations than the second cache way prediction array.

* * * * *